UNITED STATES PATENT OFFICE.

ROBERT M. KEENEY AND LOUIS F. VOGT, OF WASHINGTON, PENNSYLVANIA, ASSIGNORS TO STANDARD CHEMICAL COMPANY, OF PITTSBURGH, PENNSYLVANIA.

PROCESS OF MANUFACTURING FERRO-URANIUM.

1,240,056.  Specification of Letters Patent.  Patented Sept. 11, 1917.

No Drawing.  Application filed December 28, 1915.  Serial No. 69,045.

*To all whom it may concern:*

Be it known that we, ROBERT M. KEENEY and LOUIS F. VOGT, citizens of the United States, and residents of Washington, in the county of Washington and State of Pennsylvania, have invented certain new and useful Improvements in Processes of Manufacturing Ferro-Uranium; and we do hereby declare the following to be a full, clear, and exact description of the invention, such as will enable others skilled in the art to which it appertains to make and use the same.

This invention relates to an improved process for the manufacture of ferro-uranium,—the object of the invention being to provide a process whereby uranium shall be successfully and effectually alloyed with iron or steel to form high grade ferro-uranium.

With this and other objects in view, the invention consists in certain novel steps in the process of making ferro-uranium, as hereinafter set forth and pointed out in the claims.

In carrying our improved process into effect, we prefer to employ an electric furnace of the Siemens type, having the crucible bottom as one electrode and a single suspended electrode. If it is not desired to attempt to keep the carbon content of the alloy below four per cent. the crucible of the furnace may be made completely of carbon or graphite rammed into place with pitch as a binder. If it be desired to keep the carbon as low as possible, the crucible may be lined entirely with ground dead-burned magnesite rammed into place with pitch as a binder and the bottom electrode connection made by a steel rod buried in the magnesite. There should be a roof of silica brick over the crucible. The furnace may be of either the stationary or tilting type and it should be capable of intense concentration of heat, because of the high reduction temperature of uranium oxid, approximately 1490° C., with a carbon reducing agent.

The materials which we employ in the manufacture of ferro-uranium are uranium, preferably in the form of uranium oxid, fluorspar as a slag-forming material; a carbonaceous reducing agent, preferably petroleum coke containing at least seventy per cent. fixed carbon, and subdivided ferrous metal, such as iron or steel particles. Steel turnings may be employed with advantage. All of these materials should be as free as possible from impurities, especially silica or silicon. To attain the best results, the steel should not contain over 0.3 per cent. C.; 0.15 per cent. Si; 0.1 per cent. S; 0.1 per cent. P.

We mix ferrous metal, such as steel particles or turnings with uranium oxid or sodium uranate. For example, in a 30 per cent. uranium product, we prefer to use the proportions approximately of 1 lb. of steel turnings to six-tenths of a pound of uranium oxid ($U_3O_8$). At the same time we mix in carbonaceous material (petroleum coke for example) containing at least 70 per cent. of fixed carbon. To this mixture of steel turnings, uranium oxid, and carbon, we add fluorspar in the proportions, approximately, of eight-tenths of a pound of fluorspar to one pound of steel turnings. The mixture thus formed is charged into an electric furnace at a rate dependent upon the size of the furnace and the grade of alloy being made, but in no case should the mixture be charged so fast as to cool the furnace to any great degree. Regular intervals of charging is a matter of considerable importance. In other words, a charge should be introduced into the furnace as soon as a previous charge has been reduced and melted. In the operation of the furnace, a portion of the charge will collect on the wall of the furnace and affords a protection to the lining,—the charge thus forming, in effect, a lining in the furnace.

The reactions involved are those of simple carbon reduction, the reduced uranium alloying with the steel turnings to form ferrouranium, and may be represented as follows:

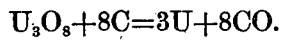

$$U_3O_8 + 8C = 3U + 8CO.$$

We have found that fluorspar is the best and probably only slag-forming material which may be successfully used to obtain a reasonable proportion of uranium in the alloy, and it should be used in considerable quantity, and be of a high grade so as to avoid impurities which would be detrimental to the alloy.

A typical charge for the production of ferro-uranium (the uranium oxid containing 68.8 uranium or 82 per cent. $U_3O_8$; the coke 70 per cent. fixed carbon; the turnings 0.31 per cent. C and 0.098 per cent. Si) may be substantially as follows:—

| | | |
|---|---|---|
| Steel turnings | 10 | lbs. |
| Uranium oxid | 7.5 | lbs. |
| Coke | 6 | lbs. |
| Fluorspar | 8 | lbs. |

Of the uranium put into this charge, at least 76 per cent. will be contained in the finished alloy. One hundred pounds of the said charge will produce approximately forty pounds of ferro-uranium, and by resmelting the residue approximately 85 per cent. of the uranium would be alloyed with the steel and about 45 pounds of ferro-uranium obtained.

The ferro-uranium made from the typical charge above stated will contain ingredients approximately in the following proportions:

| | | |
|---|---|---|
| U | 29.2 | per cent. |
| C | 5.12 | per cent. |
| Si | 2.68 | per cent. |
| Fe | 63 | per cent. |

The uranium recovery in the first smelting, using uranium oxid as the source of uranium, is from 60 to 75 per cent. of the uranium charged. In larger scale work, 85 per cent. might be made. On retreating the residue, the uranium recovery may be obtained to from 83 to 95 per cent.

When using sodium uranate as a source of uranium, the uranium recovery in the first operation is approximately 65 per cent. in a small furnace, and might be brought up to 75 per cent. On remelting the slag, the ultimate recovery of uranium can be brought to from 85 to 90 per cent.

Having fully described our invention what we claim as new and desire to secure by Letters-Patent, is:—

1. The herein described process of making ferro-uranium consisting in reducing a compound of uranium in the presence of ferrous metal and at a temperature above the melting point of the ferrous metal.

2. The herein described process of making ferro-uranium, consisting in subjecting subdivided ferrous metal and a compound of uranium to a reducing temperature above the melting point of the ferrous metal in the presence of a reducing agent and neutral slag-forming material.

3. The herein-described process of making ferro-uranium, consisting in mixing subdivided ferrous metal with a compound of uranium, a carbonaceous reducing agent and slag-forming material, and subjecting said mixture to a reducing temperature, whereby the uranium content will be alloyed into the ferrous metal.

4. The herein described process of making ferro-uranium, consisting in mixing subdivided ferrous metal with a compound of uranium, a carbonaceous reducing agent and fluorspar as a slag-forming material, and subjecting said mixture to a reducing temperature, whereby the uranium content will be alloyed with the ferrous metal.

5. The herein described process of making ferro-uranium, consisting in mixing subdivided ferrous metal with uranium oxid, a carbonaceous reducing agent, and fluorspar as a slag-forming material, and subjecting said mixture to a reducing temperature, whereby the uranium content will be alloyed with the ferrous metal.

6. The herein-described process consisting in mixing ferrous metal turnings with uranium oxid, a carbonaceous reducing agent and fluorspar and charging portions of said mixture at regular intervals into an electric furnace, whereby the uranium oxid will be reduced and the uranium content alloyed with the ferrous metal.

In testimony whereof, we have signed this specification in the presence of two subscribing witnesses.

ROBERT M. KEENEY.
LOUIS F. VOGT.

Witnesses:
R. E. LAURENCE,
A. D. RILEY.